Aug. 22, 1967     L. A. GRANGER     3,336,828
BLIND NUTS
Filed July 21, 1965     2 Sheets-Sheet 1

Aug. 22, 1967   L. A. GRANGER   3,336,828
BLIND NUTS
Filed July 21, 1965   2 Sheets-Sheet 2
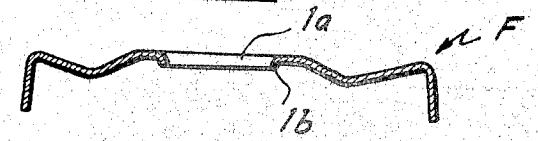
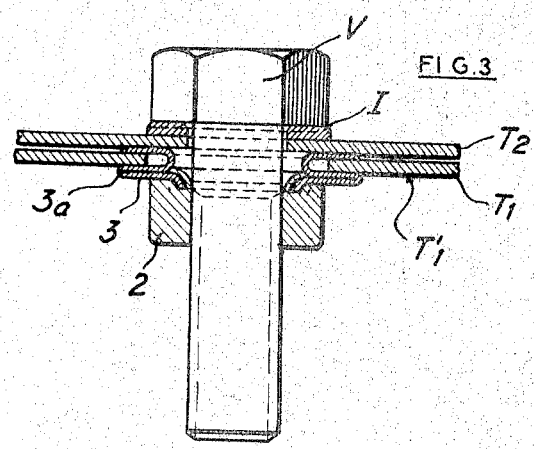
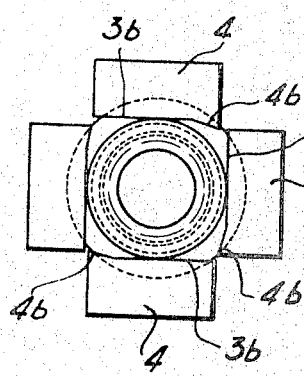
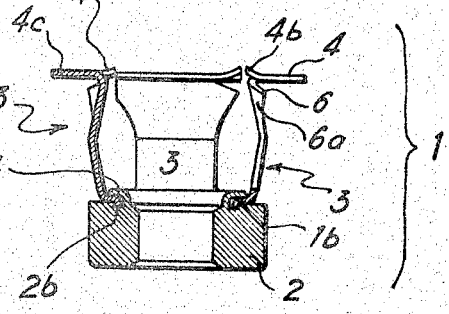

United States Patent Office 3,336,828
Patented Aug. 22, 1967

3,336,828
BLIND NUTS
Lionel André Granger, Saint-Mande, France, assignor to Anciens Etablissements Bac, Vincennes, Seine, France, a company of France
Filed July 21, 1965, Ser. No. 474,219
Claims priority, application France, Aug. 5, 1964, 984,244
4 Claims. (Cl. 85—71)

This invention relates to blind nuts. Blind nuts are devices enabling screws to be fastened to panels or other thin structures from one side only, for use when the other side of the panel is inaccessible. Usually, blind nuts should be capable of being inserted through an opening in the panel from the accessible side after which a bolt or screw can be screwed into the blind nut for example for fastening some other element to the panel.

The problem is to prevent the blind nut from turning during the screwing operation and an object of the present invention is to provide an improved means for preventing this turning.

According to the present invention a blind nut comprises a threaded member and an abutment, a cage holding the threaded member from the abutment, the cage having arms for insertion with the threaded member into an opening until the abutment engages the surroundings of the opening and including acute angle notches in the edges of the arms for engaging the edge of the surrounding of the opening with a wedging action for preventing the nut from turning when a bolt is threaded into the threaded member.

When the screw is inserted and tightening starts, the nut will move with the screw until the edge of the panel surrounding the opening engages the acute angle notches and becomes wedged therein after which the nut is prevented from turning.

This construction has the advantage that when the blind nut is inserted through the opening in the panel no further operation is necessary to secure it before the screw is inserted; that the holding of the nut does not rely on the use of interengaging teeth or the like on the nut and panel; and that the construction can be very simple.

Thus, the cage and its arms at least can be formed by pressing and bending from sheet material. The threaded member which could be a conventional nut could be welded or otherwise secured to the cage in this case.

The notches may be formed by cutting from the sides of the arms during the blanking operation or could be formed by bending outwards the parts of the cage on either side of a single cut.

The tighter the screw is driven, the more will the blind nut be forced into wedging engagement with the edge of the panel and if the cage is made deformable as the device is screwed up, the deformation can be arranged to increase the wedging action.

One embodiment of the invention will now be described, by way of example only, with reference to the accompanying drawings in which:

FIGURE 2b is a view in section across the axis of the cage of FIGURE 2a;

FIGURE 3 shows partly in section and partly in elevation the blind nut of this embodiment cooperating with a bolt in the assembly of a panel on a supporting panel;

FIGURE 4a is a view in section of this embodiment; and

FIGURE 4b is a plan view of this embodiment.

Figure 1:
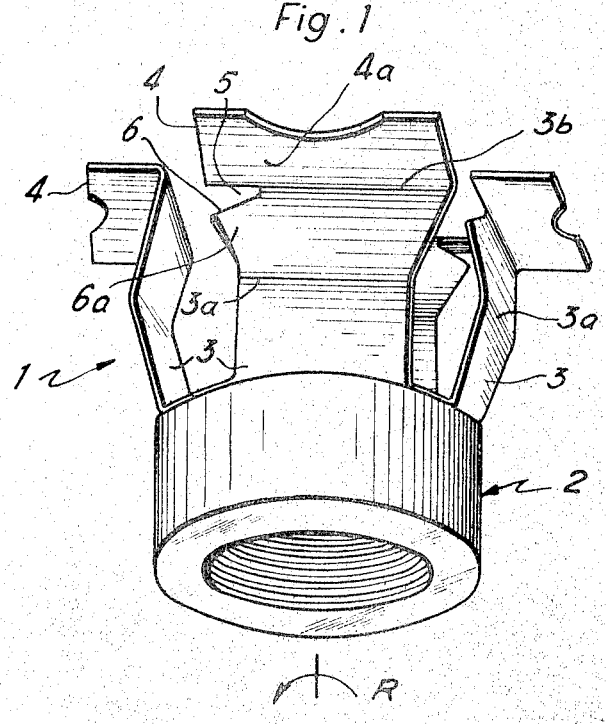
FIGURE 1 is a view in perspective of this embodiment.
Figure 2A:
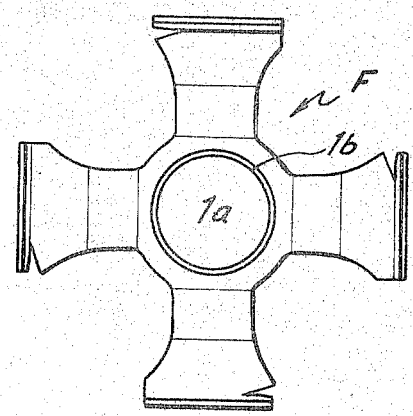
FIGURE 2a is a plan view of the sheet metal blank cut and folded to form the cage of this embodiment.

Referring to FIGURE 1 the blind nut is seen to comprise a cage 1 attached to, and co-axial with, a threaded portion 2. The cage 1 is made from a cut and folded sheet metal blank F (as can be seen from FIGURE 2a) and comprises four arms or branches 3 arranged in axial symmetry about a central annular portion 1b, which encircles an opening 1a. The threaded portion 2 is comparable with a normal nut.

The method of attaching the cage 1 to the threaded portion 2 is shown in FIGURE 4a. An annular projection 2a and an associated annular groove 2b are formed on the inner surface of the threaded portion 2. The central annular portion 1b of the cage 1 is formed with an axially and outwardly projecting rim. This rim is engaged with the annular groove 2b, thereby causing the annular projection 2a to enter the opening 1a. The projection 2a is then distorted to lock the rim of the portion 1b in the annular groove 2b.

Each of the arms or branches 3 of the cage 1 is bent inwardly and away from the threaded portion 2, part way towards a position parallel to the central axis of the blind nut. Each arm 3 has two further bends. The first of these, at 3a, occurs about a third of the way along the length of each arm; here the outer part of the arm is bent towards the central axis. The second bend, at 3b, occurs about two thirds of the way along each arm; here the bend is away from the central axis to which the extremity 4 of each arm is now nearly at right angles. This extremity 4 thus forms a flange, and the cage 1 takes on a barrel-shaped structure, the bends 3a occurring at its widest transverse dimension. This is best seen in FIGURE 1.

A cut 6 is made into the middle portion of each arm 3 from one side towards the line of the bend 3b. An acute V-notch 5 is formed by bending apart the edges of this cut 6. The edge adjacent the flange 4 is bent in a direction away from the threaded portion 2 to form a tooth 4b, while the other edge of the cut is bent in the opposite direction to form a second tooth 6a.

In use, the blind nut is passed, threaded portion 2 first, through a circular hole of suitable dimensions in the work from the accessible to the inaccessible surface. The arms 3 permit this by resilient contraction towards the central axis. When the nut is in position, the flanges 4 prevent it from falling into the hole while the expanded girth of the cage prevents it from falling out. The bolt is then screwed into the nut 2. As the bolt is turned, say in the sense R in FIGURE 1, the nut 2 and its cage will tend to turn in the same sense. However, provided the dimensions of the notch 5 and the angle of the cut 6 are compatible with the thickness and coefficient of friction of the working surface around the hole, that surface will become wedged between the cut 6 and the surface 4a of the flange 4. Clearly, the side of each arm 3 in which the cut 6 is made will depend on the turning direction R.

The wedging action, which is accentuated as the cage 1 turns, is enhanced by the bending apart of the teeth 6a and 4b as described above. The positions of these teeth are best seen in FIGURE 4a.

As the cage 1 becomes wedged the bolt can be screwed into the threaded portion 2 and the further the bolt enters the threaded portion 2, the greater becomes the compression in the arms 3. If the cage is deformable, then the convexity of the arms 3 at 3a will increase (accentuating the wedging action still further) until the parts of the arm on either side of the bend 3a have completely folded together. This deformation is shown taken to completion in FIGURE 3. Here, two panels $T_1$ (of which the side $T_1$ is inaccessible) and $T_2$ are joined by means of the blind nut, the bolt V and a washer I. A setup of this kind is particularly appropriate for the assembly of body-work panels for motor-cars.

It will be understood that the invention is not limited to the single embodiment described but extends to all the variants corresponding to its principle. For example, the threaded portion 2 and the cage 1 might be constructed as an integral component.

What is claimed is:

1. A blind nut adapted to be inserted into an opening in a thin structure, one face of which is not readily accessible, said nut comprising a deformable cage having a generally barrel-like shape, a threaded member fixed at the bottom of said cage and axially aligned with said cage, said cage including a plurality of flat resilient arms, arranged in axial symmetry, fixed to said threaded member and extending upwardly therefrom, said arms having upper ends, remote from said threaded member, outwardly bent about a bend line to form transverse flanges, said flanges being adapted to lie upon the accessible face of said structure when said nut is inserted into said opening in the structure, said arms having acute angle notches beneath said flanges, said notches having upper edges disposed along said bend lines and lower edges extending upwardly and transversely from one lateral edge of said arm towards said bend lines, said notches opening externally of said arms and widening in the direction in which a bolt is threadably advanced in said threaded member such that the lower edges of said notches engage the inaccessible face of said structure surrounding said opening and said blind nut is prevented from turning by wedging action of said structure between said flanges and said lower edges of said notches, continued rotation of the bolt causing deformation of the cage and collapse of the arms and increased wedging action of said flanges and the lower edges of the notches on said structure.

2. A blind nut as claimed in claim 1, wherein said upper edges of said notches are bent inwardly and said lower edge is bent outwardly to form a tooth.

3. A blind nut as claimed in claim 1, wherein said arms are bowed outwardly to form an expanded girth acting as creasing lines when a bolt is threaded in said threaded member.

4. A blind nut as claimed in claim 1, wherein said arms are formed by pressing and bending a blank from sheet material.

References Cited

UNITED STATES PATENTS

| Re. 22,543 | 9/1944 | Tinnerman | 85—71 |
| 2,000,241 | 5/1935 | Mangin | 151—41.75 |
| 2,017,421 | 10/1935 | Post | 85—71 |
| 2,406,415 | 8/1946 | Tinnerman | 85—80 |
| 2,539,172 | 1/1951 | Andrews | 151—41.75 |
| 2,762,252 | 9/1956 | Karitzky | 85—71 |
| 3,091,425 | 5/1963 | Van Steenhoven | 85—80 |

FOREIGN PATENTS

| 917,384 | 9/1946 | France. |
| 1,285,367 | 1/1962 | France. |
| 832,221 | 2/1952 | Germany. |
| 732,556 | 6/1955 | Great Britain. |

CARL W. TOMLIN, *Primary Examiner.*

M. PARSONS, Jr., *Assistant Examiner.*